United States Patent
Lee et al.

(10) Patent No.: US 10,579,218 B2
(45) Date of Patent: Mar. 3, 2020

(54) APPLICATION PRODUCING APPARATUS, SYSTEM, METHOD, AND NON-TRANSITORY COMPUTER READABLE MEDIUM

(71) Applicant: NAVER Corporation, Seongnam-si, Gyeonggi-do (KR)

(72) Inventors: Sung Jae Lee, Seongnam-si (KR); Joo Hwan Bae, Seongnam-si (KR); Hyun Joo Bae, Seongnam-si (KR); Jung Seob Lee, Seongnam-si (KR); Gil Do Kim, Seongnam-si (KR); Won Kuym Kim, Seongnam-si (KR); Chang Hoon Yang, Seongnam-si (KR); Gyeong Hwan Jo, Seongnam-si (KR); Hyun Tae Cho, Seongnam-si (KR); Byung Yong Song, Seongnam-si (KR); Do Yun Kim, Seongnam-si (KR); Jin Woo Yoo, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 401 days.

(21) Appl. No.: 15/272,877

(22) Filed: Sep. 22, 2016

(65) Prior Publication Data
US 2017/0300187 A1 Oct. 19, 2017

(30) Foreign Application Priority Data
Apr. 15, 2016 (KR) .................. 10-2016-0046504

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 3/0488* (2013.01);
(Continued)

(58) Field of Classification Search
None
See application file for complete search history.

(56) References Cited

U.S. PATENT DOCUMENTS 6,215,490 B1 *  4/2001  Kaply .................. G06F 3/0481
                                                    715/788
6,604,125 B1    8/2003  Belkin
(Continued)

FOREIGN PATENT DOCUMENTS

CN      101777008 A    7/2010
EP         2752752 A1  7/2014
(Continued)

OTHER PUBLICATIONS

Korean Notice of Allowance dated Sep. 29, 2017 for corresponding Korean Patent Application No. 10-2017-0025044.
(Continued)

*Primary Examiner* — William C Trapanese
(74) *Attorney, Agent, or Firm* — Harness, Dickey & Pierce, P.L.C.

(57) ABSTRACT

An application producing method regarding a first and second application, the method includes receiving an application generation request related to a second application, the second application being subordinate to a first application, generating the second application and computer readable instructions related to a switch interface for selecting at least one of the first and second applications, the switch interface computer readable instructions related to the switch interface, which when executed by at least one application executing apparatus, causes the application executing apparatus to display the switch interface on at least one of the first and second applications, and when the switch interface is in a first state, the first application is controlled based on a first user input received by the at least one application executing
(Continued)

apparatus, and when the switch interface is in a second state, the second application is controlled based on the first user input.

19 Claims, 15 Drawing Sheets

(51) Int. Cl.
*G06F 3/0484* (2013.01)
*G06F 8/30* (2018.01)
*G06F 3/0488* (2013.01)
*G06F 3/0481* (2013.01)
*G06F 8/38* (2018.01)

(52) U.S. Cl.
CPC ............ *G06F 3/04845* (2013.01); *G06F 8/30* (2013.01); *G06F 8/38* (2013.01); *G06F 2203/04804* (2013.01)

(56) References Cited

U.S. PATENT DOCUMENTS

| | | | |
|---|---|---|---|
| 8,504,981 | B2 | 8/2013 | Hattori et al. |
| 8,819,585 | B2 | 8/2014 | Sareen et al. |
| 9,046,986 | B2 | 6/2015 | Park et al. |
| 9,665,381 | B2 | 5/2017 | Suggs et al. |
| 2002/0054141 | A1 | 5/2002 | Yen et al. |
| 2004/0201608 | A1* | 10/2004 | Ma .................. G06F 3/0481 715/719 |
| 2011/0154328 | A1 | 6/2011 | Mo et al. |
| 2013/0104065 | A1* | 4/2013 | Stecher ............. G06F 3/0481 715/767 |
| 2013/0227419 | A1 | 8/2013 | Lee et al. |
| 2015/0185980 | A1 | 7/2015 | An et al. |
| 2015/0363082 | A1* | 12/2015 | Zhao ................ G06F 3/0481 715/800 |

FOREIGN PATENT DOCUMENTS

| | | |
|---|---|---|
| JP | 2002-149299 A | 5/2002 |
| JP | 2009-181329 A | 8/2009 |
| KR | 10-2001-0055927 A | 7/2001 |
| KR | 20110055532 A | 5/2011 |
| KR | 10-2013-0058947 A | 6/2013 |
| KR | 2013-0097433 A | 9/2013 |
| WO | WO-2010/062623 A2 | 6/2010 |
| WO | WO-2010148884 A1 | 12/2010 |

OTHER PUBLICATIONS

Korean Office Action corresponding to Korea Patent Application No. 10-2017-0025044 dated Jul. 17, 2017.
Taiwanese Office Action for corresponding Taiwanese Patent Application No. 105140612 dated Nov. 20, 2017.
Taiwanese Office Action dated Oct. 29, 2018 for corresponding Taiwanese Patent Application No. 105140612.
Korean Office Action dated Sep. 13, 2018 for corresponding Korean Patent Application No. 10-2017-0092260.
Korean Notice of Allowance dated Mar. 29, 2019 for corresponding Korean Application No. 10-2017-0092260.
Extended European Search Report dated Nov. 15, 2019 for corresponding European Application No. 16898751.9.

* cited by examiner

APPLICATION PRODUCING APPARATUS, SYSTEM, METHOD, AND NON-TRANSITORY COMPUTER READABLE MEDIUM

CROSS-REFERENCE TO RELATED APPLICATION

This application claims the benefit of priority under 35 U.S.C. § 119 to Korean Patent Application No. 10-2016-0046504, filed on Apr. 15, 2016, in the Korean Intellectual Property Office (KIPO), the entire contents of which are incorporated herein by reference.

BACKGROUND

1. Field

One or more example embodiments relate to an application producing apparatus, system, method, and/or non-transitory computer readable medium. Additionally, one or more example embodiments relate to an application driving apparatus, system, method, and/or a non-transitory computer readable medium.

2. Description of the Related Art

With the wide usage of smart phones, various applications, such as web browsers, social network services (SNS), Internet based games, and other Internet based utility programs, have increased in popularity. This is in contrast to the case of general mobile phones that could only make and take telephone calls, and transmit and receive simple text messages. Accordingly, software tools for producing software applications executable in smart phones are in great demand in response to the increase in demand for smart phone software applications.

SUMMARY

One or more example embodiments include an application producing apparatus, an application producing method, an application producing system, and/or an application producing non-transitory computer readable medium, which enable an application producer to generate a second software application by subordinating (e.g., capable of being executed along with, linked to, connected to) the second software application to a first software application, and also providing a switch interface graphical user interface configured to switch and select between the first and second applications.

One or more example embodiments include an application producing apparatus, method, system, and/or non-transitory computer readable medium, which enable an application user to execute a second application subordinated to a first application, and at this time, also provide a switch application for switching and selecting the first and second applications to the user.

Additional aspects will be set forth in part in the description which follows and, in part, will be apparent from the description, or may be learned by practice of the presented example embodiments.

According to one or more example embodiments, an application producing method regarding a first application and a second application includes receiving, using the at least one processor, an application generation request related to the second application, the second application being subordinate to the first application, generating, using the at least one processor, the second application and computer readable instructions related to a switch interface for selecting at least one of the first and second applications, the switch interface computer readable instructions related to the switch interface, which when executed by at least one application executing apparatus, causes the at least one application executing apparatus to display the switch interface on at least one of the first and second applications, and when the switch interface is in a first state, the first application is controlled based on a first user input received by the at least one application executing apparatus, and when the switch interface is in a second state, the second application is controlled based on the first user input, and sending the generated second application and the switch interface computer readable instructions to the at least one application executing apparatus.

According to one or more example embodiments, an application producing apparatus regarding a first application and a second application includes a memory having computer readable instructions stored thereon, and at least one processor configured to execute the computer readable instructions to receive an application generation request related to the second application, the second application being subordinate to the first application, generate the second application and switch interface computer readable instructions related to a switch interface for selecting at least one of the first and second applications, the switch interface computer readable instructions, when executed by at least one application executing apparatus, causes the at least one application executing apparatus to display the switch interface on at least one of the first and second applications, when the switch interface is in a first state, the first application is controlled based on a first user input received by the at least one application executing apparatus, and when the switch interface is in a second state, the second application is controlled based on the first user input, and sending the generated second application and the switch interface computer readable instructions to the at least one application executing apparatus.

According to one or more example embodiments, an application driving apparatus includes a memory having computer readable instructions stored thereon, and at least one processor configured to execute the computer readable instructions to execute a first application and a second application, display a switch interface on at least one of the first and second applications, and receive a first user input, wherein when the switch interface is in a first state, control the first application based on the first user input, and when the switch interface is in a second state, control the second application based on the first user input.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
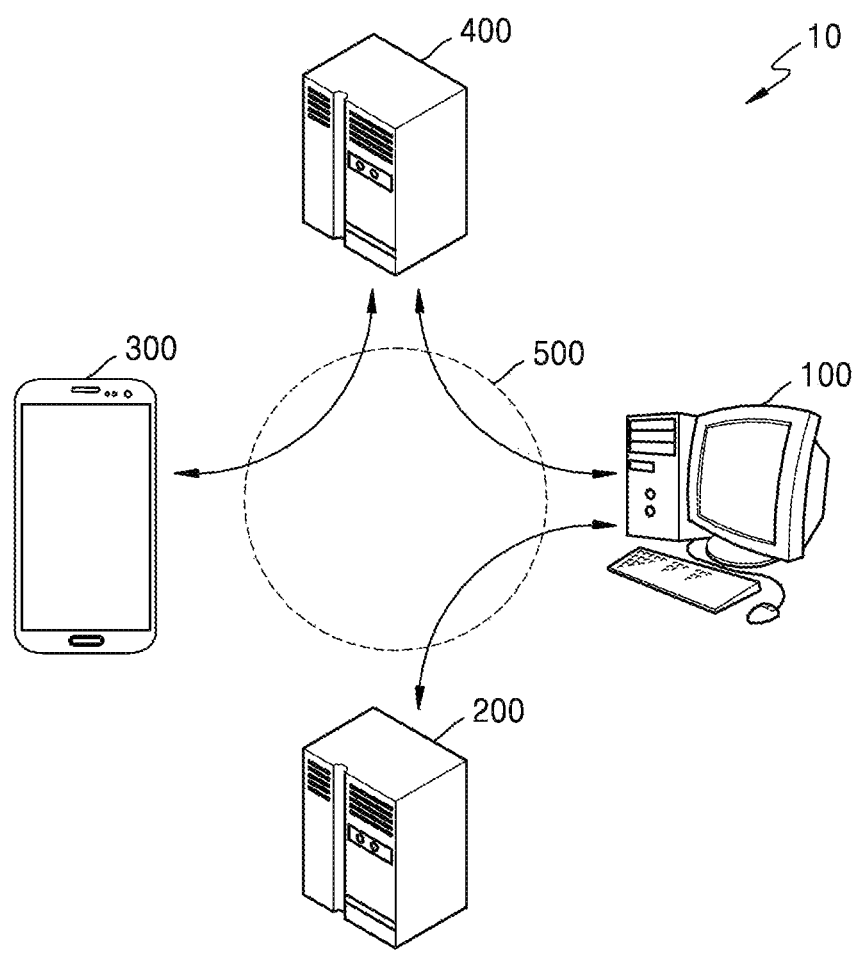
FIG. 1 is a diagram schematically illustrating a structure of an application producing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a diagram schematically illustrating a structure of an application producing system 10 according to at least one example embodiment.

Referring to FIG. 1, the application producing system 10 according to at least one example embodiment may include an application producing apparatus 100, an application producing tool distribution server 200, an application driving apparatus 300, and an application distribution server 400. Also, the application producing system 10 may further include a communication network 500.

The application producing apparatus 100 may be an electronic computing apparatus for performing an application producing method according to at least one example embodiment. The application producing apparatus 100 may transmit and receive an electronic signal to and from the application producing tool distribution server 200 and/or the application distribution server 400 using wired and/or wireless communication networks. The application producing apparatus 100 may download, from the application producing tool distribution server 200, a computer program or software application including an application producing tool (for example, a computer program provided in the form of a software development kit (SDK)). The application producing apparatus 100 may produce an application via the application producing method according to at least one example embodiment, by using the application producing tool. The application producing apparatus 100 may upload the produced application to the application distribution server 400.

In FIG. 1, the application producing apparatus 100 is illustrated as a desktop computer, but the example embodiments are not limited thereto, and the application producing apparatus 100 may be any electronic computing apparatus capable of transmitting and receiving an electronic signal to and from another apparatus in a wired and/or wireless communication environment, as described above. For example, the application producing apparatus 100 may be a personal computer (PC), a tablet computer, a smart phone, a smart television (TV), a personal digital assistant (PDA), a laptop computer, a media player, a micro-server, a global positioning system (GPS) apparatus, an electronic book terminal, a digital broadcasting terminal, a personal navigation device, an Internet kiosk, an MP3 player, a digital camera, a wearable device, a Virtual Reality (VR) device, an Augmented Reality (AR) device, an Internet of Things (IoT) device, and/or another mobile or non-mobile computing device, but is not limited thereto.

The application producing tool distribution server 200 may be one or more servers that distribute the application producing tool. Here, the application producing tool may be a computer program in the form of an SDK provided to produce an application. The application producing tool distribution server 200 may be an electronic computing apparatus in which an environment for producing an application producing tool is provided, and/or may be an electronic computing apparatus simply storing an application producing tool produced by an external electronic computing apparatus.

The application producing tool distribution server 200 may be one or more servers that provide not only an application producing tool distribution service, but also a general search service (e.g., a search engine), content providing services (e.g., video providing services, audio providing services, website providing services, software application providing services, smartphone application providing services, location based content providing services, navigation providing services, etc.), social media providing services, and/or various other services for enhancing user convenience. In other words, the application producing tool distribution server 200 may provide not only the application producing tool distribution service but also various services, such as a search service, an email service, a blog service, a social network service (SNS), a news service, a shopping information providing service (e.g., e-commerce website), etc.

Additionally, the application producing tool distribution server 200 may be one or more servers connected to at least one server providing a portal service, such as a search service, an email service, a news service, a shopping service, etc., to provide at least one webpage and/or data provided by the portal service to the application producing apparatus 100 that requests the portal service to provide information. Here, the application producing tool distribution server 200 and the server providing the portal service may be physically separate interconnected servers or a single physical server that is conceptually and/or logically a plurality of separate servers.

The application driving apparatus 300 may be an electronic computing apparatus driving an application produced according to the application producing method, according to at least one example embodiment. The application driving apparatus 300 may be an electronic computing apparatus driving an application according to an application driving method, according to at least one example embodiment. The application driving apparatus 300 may transmit and receive an electronic signal to and from the application distribution server 400 using wired and/or wireless communication networks. The application driving apparatus 300 may download at least one computer program, such as the application, from the application distribution server 400.

In FIG. 1, the application driving apparatus 300 is illustrated as a smart phone, but example embodiments are not limited thereto, and the application driving apparatus 300 may be any electronic computing apparatus capable of transmitting and receiving an electronic signal with another apparatus in a wired and/or wireless communication environment as described above. For example, the application driving apparatus 300 may be a personal computer (PC), a tablet computer, a desktop computer, a smart TV, a mobile phone, a PDA, a laptop computer, a media player, a micro-server, a GPS apparatus, an electronic book terminal, a digital broadcasting terminal, a personal navigation device, an Internet kiosk, an MP3 player, a digital camera, a wearable device, a Virtual Reality (VR) device, an Augmented Reality (AR) device, an Internet of Things (IoT) device, and/or another mobile or non-mobile computing device, but is not limited thereto.

The application distribution server 400 may be at least one server that stores and/or distributes various applications produced through the application producing apparatus 100. The application distribution server 400 may transmit and receive an electronic signal to and from the application producing apparatus 100 and/or the application driving apparatus 300. The application distribution server 400 may receive an application storage request signal from the application producing apparatus 100. The application distribution server 400 may receive a data signal including information about an application from the application producing apparatus 100, and store the information about the application included in the data signal. The application distribution server 400 may receive an application provision request signal from the application driving apparatus 300. The application distribution server 400 may transmit the data signal including the information about the application to the application driving apparatus 300.

The application distribution server 400 may be a server providing not only an application distribution service but also a general search service, a content providing service, and/or various services for enhancing convenience of users. In other words, the application distribution server 400 may provide not only the application distribution service but also other services, such as a search engine service, an email service, a blog service, an SNS, a news service, a shopping information providing service, etc.

Additionally, the application distribution server 400 may be at least one server connected to one or more servers providing a portal service, such as a search service, an email service, a news service, a shopping service, etc., to provide at least one webpage and/or data provided by the portal service to the application producing apparatus 100 and/or the application driving apparatus 300, which requests the portal service to provide information. Here, the application distribution server 400 and the server providing the portal service may be physically separate interconnected servers or a single physical server that is conceptually and/or logically a plurality of servers.

Also, the application producing tool distribution server 200 and the application distribution server 400 may be separate individual interconnected electronic computing apparatuses or may be a single physical server that is conceptually and/or logically a plurality of servers.

The communication network 500 may provide a wired and/or wireless communication path between at least two of the application producing apparatus 100, the application producing tool distribution server 200, the application driving apparatus 300, and the application distribution server 400. Examples of the communication network 500 may include wired networks, such as local area networks (LANs), wide area networks (WANs), metropolitan area networks (MANs), and integrated service digital networks (ISDNs), fiber-optic networks, etc., and/or wireless networks, such as wireless LANs, code division multiple access (CDMA) networks, Global System for Mobile Communications (GSM) networks, Bluetooth networks, satellite communication networks, etc., but are not limited thereto.

Figure 2:
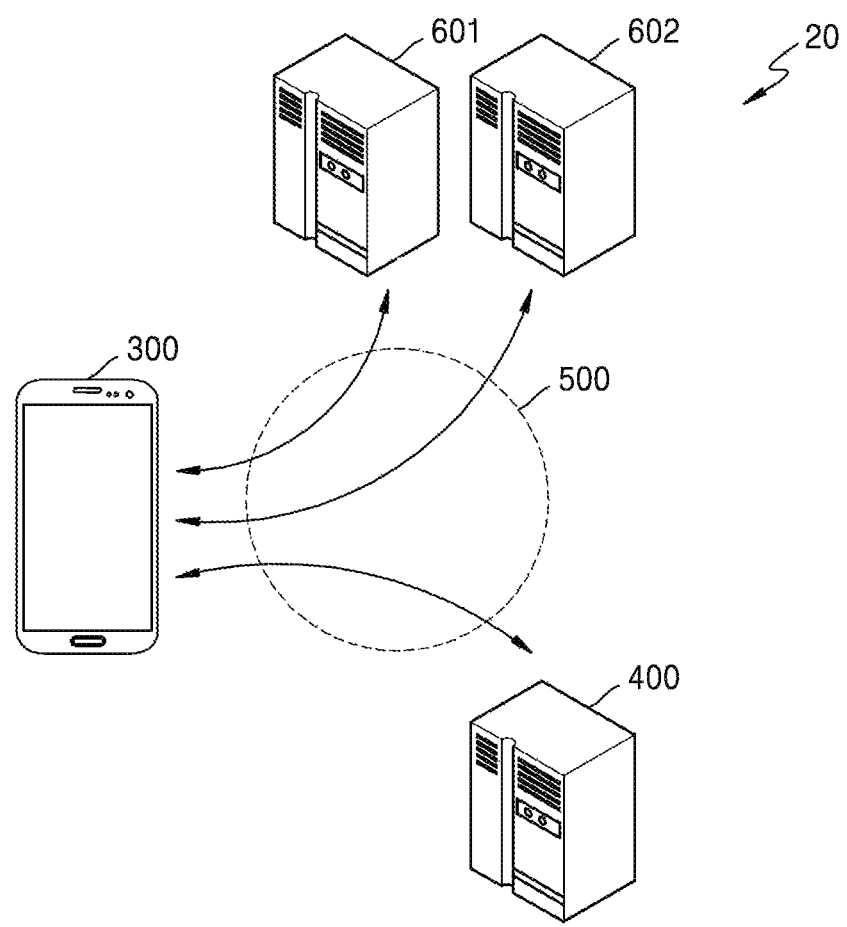
FIG. 2 is a diagram schematically illustrating a structure of an application driving system according to at least one example embodiment.

FIG. 2 is a diagram schematically illustrating a structure of an application driving system 20 according to at least one example embodiment.

Referring to FIG. 2, the application driving system 20 according to at least one example embodiment may include the application driving apparatus 300, the application distribution server 400, a first application management server 601, and a second application management server 602. Also, the application driving system 20 may further include the communication network 500.

The application driving apparatus 300 may download a certain application (e.g., desired application) from the application distribution server 400. The certain application may include information about both a first application and a second application. Here, the second application may be an application that has a relationship with the first application, e.g., the second application may be subordinated to (e.g., capable of being executed along with, linked, connected to) the first application. For example, when the certain application is executed, the first application may be operated (e.g., the first application may be called and executed while the certain application is being executed and/or in response to the execution of the certain application). Then, when one of the functions, methods, classes, procedures, subroutines, API calls, etc. provided by the first application are used, the second application may be operated. Also, whether to drive (e.g., run, load, execute, call, etc.) the second application may be subordinately determined based on the execution status of the first application and the relationship between the first application and the second application (e.g., subordinate relationship, superior relationship, causal relationship, logical relationship, functional relationship, etc.). In other words, when the first application is closed, the second application may also be closed. Additionally, the closing of the second application may not affect an operation of the first application, or in other words, the first application may remain open even upon the closing of the second application. Meanwhile, the first and second applications may be different threads (and/or different processes) included in the certain application. Additionally, the first application may be a master thread and the second application may be a servant thread subordinated to the master thread (and/or master process and servant process).

When the certain application is executed in the application driving apparatus 300, the first application may be operated (e.g., called, loaded, executed, etc.), and the second application may be operated (e.g., called, loaded, executed, etc.) by at least one certain function (e.g., desired function) in the first application. Here, a server that transmits and receives data to and from the application driving apparatus 300 in relation to an operation of the first application may be the first application management server 601, and a server that transmits and receives data to and from the application driving apparatus 300 in relation to an operation of the second application may be the second application management server 602. In other words, the first application may be managed by the first application management server 601 and the second application may be managed by the second application management server 602, however the example embodiments are not limited thereto. While two separate application management servers are depicted in FIG. 2, the number of servers of the example embodiments are not limited thereto and may include less or more servers. For example, the first application management server 601 and the second application management server 602 may be combined into a single server, or one or both of the first and second application management server may comprise a plurality of interconnected servers.

The first application management server 601 and the second application management server 602 may respectively be servers storing information related to the first application and the second application, respectively. In other words, the first and second application management servers 601 and 602 may respectively store results obtained as the application driving apparatus 300 drives the first and second applications. The first application management server 601 and the second application management server 602 may manage operations of the first and second applications by transmitting and receiving data signals to and from the application driving apparatus 300. For example, the first application management server 601 may store various types of data related to the first application driven by the application driving apparatus 300 (for example, when the first application is a game, data related to information about the game, such as account information of a user of the application driving apparatus 300 in the game, a game progress level, game money, game item information, etc.), and transmit and receive the various types of data to and from the application driving apparatus 300. Similarly, the second application management server 602 may store various types of data related to the second application driven by the application driving apparatus 300 (for example, when the second application is an application providing a document preparation and viewing service, data related to information about a document viewable through the application, information about a document to be prepared, information related to user additions, modifications, and/or deletions, to the document, etc.), and transmit and receive the various types of data to and from the application driving apparatus 300.

The first and second application management servers 601 and 602 may be separate electronic computing apparatuses that are distinguished from each other, but are not limited thereto.

The communication network 500 may provide a wired and/or wireless communication path between at least two of the application driving apparatus 300, the application distribution server 400, the first application management server 601, and the second application management server 602.

Figure 3:
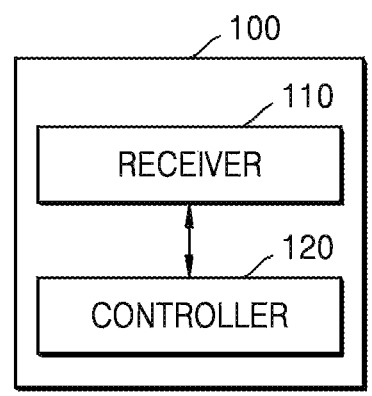
FIGS. 3 and 4 are block diagrams of a structure of an application producing apparatus according to one or more example embodiments.
Figure 4:
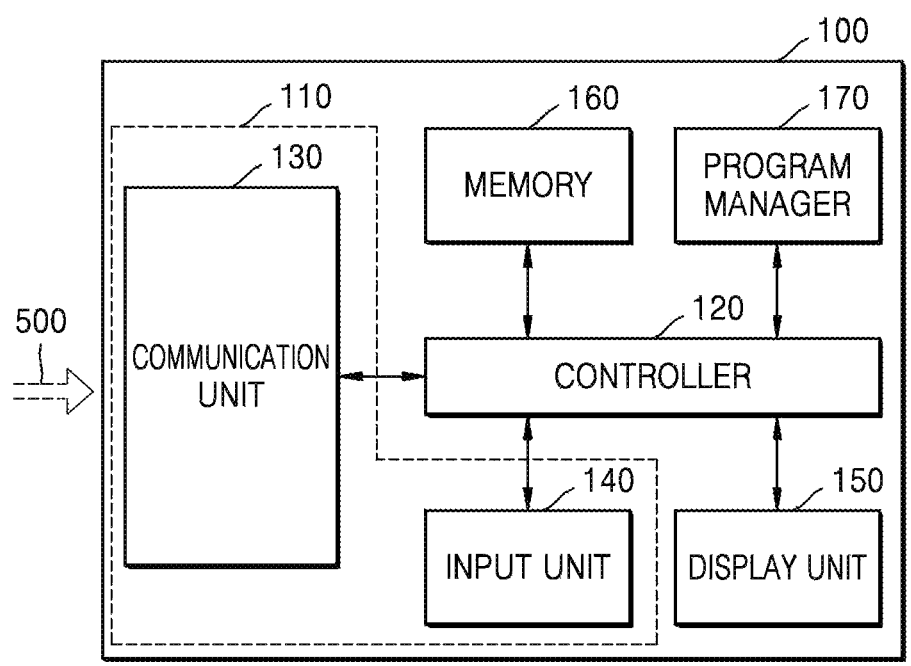

FIGS. 3 and 4 are block diagrams of a structure of the application producing apparatus 100 according to some example embodiments.

First, referring to FIG. 3, the application producing apparatus 100 according to at least one example embodiment may include a receiver 110, a controller 120, etc. The receiver 110 may be specially controlled by the controller 120 to perform the functionality of the receiver 110, and/or may be embodied within the controller 120, but is not limited thereto.

The receiver 110 may receive a first application generation request. The first application generation request may be input by the user of the application producing apparatus 100 and/or may be automatically generated (for example, by the controller 120, etc.). The receiver 110 may receive the first application generation request through an input of touching or putting physical pressure on an input/output device (not shown) and/or input/output unit (not shown) included in the application producing apparatus 100, such as a physical keyboard, a virtual keyboard, a mouse, a touchpad, a stylus, a touchscreen, a microphone, a camera, a sensor, etc. Additionally, the receiver 110 may receive the first application generation request by receiving an electronic signal including first application generation request information from a communication unit (not shown) included in the application producing apparatus 100.

The receiver 110 may receive a second application generation request, wherein driving of the second application is determined (e.g., subordinately determined) based on the driving of the first application. Here, the second application generation request may be input by the user of the application producing apparatus 100 and/or automatically generated (for example, by the first application, the controller 120, etc.). The receiver 110 may receive the second application generation request through an input of touching, putting physical pressure on, speaking into, gesturing, etc., the input unit included in the application producing apparatus 100. Additionally, the receiver 110 may receive the second application generation request by receiving an electronic signal including the second application generation request information from the communication unit included in the application producing apparatus 100.

The controller 120 may generate the second application according to the second application generation request received through the receiver 110. Here, the controller 120 may generate the second application such that driving of the second application is subordinated, connected, related, and/or associated to the driving of the first application. For example, the controller 120 may generate the second application such that when the first application is closed while the first and second applications are both being driven, the second application is also closed together with the first application. The controller 120 may generate the second application such that driving of the second application is unrelated to the start of the first application. The controller 120 may generate the second application such that the closing of the second application does not affect the driving of the first application.

Meanwhile, the controller 120 may be at least one data processing device, for example, a data processing device that is embedded in hardware and includes a physically structured circuit to perform a function expressed in a code or command included in a program. Examples of such a data processing apparatus include a microprocessor, a central processing unit (CPU), one or more processor cores, a multiprocessor, an application specific integrated circuit (ASIC), a field programmable gate array (FPGA), a System on Chip (SoC), etc., but are not limited thereto. The controller 120 may be configured to access and/or execute programs, functions, instructions, and data stored in a memory (not shown). Once the program (e.g., computer readable instructions) is loaded into the controller 120, the controller 120 executes the program (e.g., computer readable instructions), thereby transforming the controller 120 into a special purpose processor. The controller 120 may be implemented as one or more processors, one or more processor cores, a distributed processing system, a network processing system, a cloud processing system, etc. The controller 120 may include components and/or be specially caused to execute as a receiver 110 according to at least one example embodiment.

The controller 120 may automatically and/or based on user inputs, preferences, configurations, settings, etc., generate various applications, such as the second application, according to at least one example embodiment. The second application may include various graphical user interface (GUI) elements, such as a switch interface for selecting one of a plurality of applications, (e.g., the first and second applications), etc. The GUI elements and may be displayed on the GUI of at least one of the plurality of applications (e.g., at least one of the first and second applications). For example, the controller 120 may generate the second application such that the second application includes a function of displaying the switch interface on at least one of the first and second applications when the first and second applications are simultaneously driven. Here, the switch interface may be in a plurality of states, such as a first or second state, ON/OFF state, a selection interface for three or more options, etc. For example, the switch interface may be an interface having a graphical form of a switch, and the controller 120 may set the switch interface to be in the first state when the switch is in a first position and in the second state when the switch is in a second position. However, the example embodiments of the switch interface are not limited thereto.

According to at least one example embodiment, the controller 120 may generate the second application and the switch interface such that the operation of the first application is controlled based on a first input received through the application driving apparatus 300, when the switch interface is in the first state, and an operation of the second application is controlled based on the first input received through the application driving apparatus 300 when the switch interface is in the second state. In other words, the controller 120 may generate the second application and the switch interface such that the second application (and/or the first application) includes a function in which an operation of one of the first and second applications is selectively controlled based on a state of the switch interface even when the same first input is input to the application driving apparatus 300.

Additionally, the controller 120 may selectively generate the second application, which may include the generation of the switch interface, such that the second application includes a function in which the state of the switch interface is controlled based on a second input received through the application driving apparatus 300. In other words, the second input received through the application driving apparatus 300 may be an input for controlling the state of the switch interface or may be an input that is not intended to control the state of the switch interface but indirectly results in the control of the state of the switch interface. The controller 120 may generate the second application such that the second application includes a function in which the state of the switch interface is controlled to be one of the first and second states corresponding to the second input received through the application driving apparatus 300. Accordingly, the application producing apparatus 100 may generate the second application such that the second application includes a function enabling the user of the application driving apparatus 300 to manipulate the switch interface as intended.

Also, the controller 120 may selectively generate the second application such that the second application includes a function in which requests according to the first input received through the application driving apparatus 300 are transmitted to the first application management server 601 when the operation of the first application is controlled by the first application management server 601, and the requests according to the first input are transmitted to the second application management server 602 when the operation of the second application is controlled by the second application management server 602. Accordingly, the application producing apparatus 100 may generate the second application such that the second application includes a function in which the first and second applications are managed by different servers according to at least one example embodiment, but the example embodiments are not limited thereto.

Also, the controller 120 may selectively generate the second application such that the second application includes a function in which an active state of the first application is maintained even when the state of the switch interface changes between different states, such as from the first state to the second state, etc. For example, generally, the first and second applications may be driven in a smart phone such that when a state of the second application changes to an active state while the first application is in the active state, a state of the first application is changed to an inactive state (e.g., the first application may be paused, put into sleep mode, may be swapped out of memory, etc.). However, according to at least one example embodiment, the controller 120 may generate the second application such that the second application includes a function in which, even when the second application switches to the active state (i.e., even when the switch interface switches to the second state) while the first application is in an active state (i.e., while the switch interface is in the first state), the first application does not switch to the inactive state but maintains the active state. Similarly, even when a state of controlling the second application is switched to a state of controlling the first application after both the first and second applications are driven, the second application may also maintain the active state. In other words, the second application may be generated such that the second application includes a function in which the second application is not inactivated but maintains the active state even when the state of the switch interface changes from the second state to the first state, e.g., the processes for the first application and the second application may both be active and may both be loaded in active memory space. According to at least one example embodiment, the switch interface may include two states (e.g., a first state where the first application being active in the foreground while the second application is active in the background, and a second state where the second application is active in the foreground while the first application is active in the background), three states (e.g., a first state where the first application is active and the second application is inactive, a second state where the second application is active and the first application is inactive, and a third state where both the first and second applications are active, etc.). Accordingly, the application producing apparatus 100 may generate the second application such that the second application includes a function in which the first application continuously operates even when the user of the application driving apparatus 300 is using the second application.

Also, additionally, the controller 120 may generate the second application such that the second application includes a function in which a display size or display proportions are adjusted according to the state of the switch interface. In other words, the controller 120 may generate the second application such that the second application includes a function enabling the user of the application driving apparatus 300 to adjust the display setting of the second application, such as the display size of the second application, the window state of the second application, whether the second application is in the foreground or the background of the display, the display device that the second application is displayed upon in a multi-display environment, etc. For example, the controller 120 may generate the second application such that the second application includes a function in which the state of the switch interface is determined to be in the first state when the display size and/or the display proportions of the second application are higher than a first reference value, and to be in the second state when the display size and/or the display proportions of the second application are lower than or equal to the first reference value. In other words, the controller 120 may generate the second application such that the second application includes a function in which the operation of the second application is controlled according to the first input when the user of the application driving apparatus 300 maintains the display size of the second application to be equal to or higher than a certain level, and the operation of the first application is controlled according to the first input when the user maintains the display size of the second application to be lower than the certain level according to at least one example embodiment, but the example embodiments are not limited thereto.

Also, the controller 120 may selectively generate the second application such that the second application includes a function in which the transparency setting and/or other visual settings (e.g., color settings, two-dimension (2D) or three-dimension (3D) settings, video format settings, video resolution settings, video playback settings (e.g., frames per second playback settings, etc.), video compression settings, etc.) of the second application are adjusted according to the state of the switch interface. For example, the controller 120 may generate the second application such that the second application includes a function in which the state of the switch interface is determined to be in the first state when the transparency of the second application is higher than a second reference value, and to be in the second state when the transparency of the second application is lower than or equal to the second reference value, etc. Examples of how such a function is performed in the application driving apparatus 300 will be described later with reference to FIGS. 10 through 13.

Also, additionally, the controller 120 may generate the second application such that displaying of a function tab GUI element of the second application is determined according to the state of the switch interface. For example, the second application may be displayed to include a GUI element displayed in a floating button. Here, the controller 120 may determine the state of the switch interface to be in the second state when the floating button included in the second application is selected and to be in the first state when a region aside from the second application is selected, etc. An example of how such a function is performed in the application driving apparatus 300 will be described later with reference to FIG. 14.

Meanwhile, referring to FIG. 4, the application producing apparatus 100 according to at least one example embodiment may further include a communication unit 130, an input unit 140, a display unit 150, a memory 160, and a program manager 170.

The communication unit 130 may be a physical device configured to transmit and receive a data signal to and from at least one of the application producing tool distribution server 200, the application driving apparatus 300, and/or the application distribution server 400, etc., over a wired and/or wireless connection. The communication unit 130 may be a Bluetooth communication unit, a Bluetooth low energy (BLE) communication unit, a near field communication (NFC) unit, a wireless local area network (WLAN) (Wi-Fi) communication unit, a GSM communication unit, a CDMA communication unit, an LTE communication unit, a Zigbee communication unit, an infrared data association (IrDA) communication unit, a Wi-Fi direct (WFD) communication unit, an ultra wideband (UWB) communication unit, an Ant+ communication unit, etc., but is not limited thereto.

The input unit 140 may be a physical device capable of receiving user inputs, such as commands requesting to perform various types of operations, from the user of the application producing apparatus 100. The input unit 140 may be at least one of a mouse, a keyboard, a touch pad, a microphone, a camera, a touch panel, various types of sensors, etc.

Here, the communication unit 130 and the input unit 140 may both be included in the receiver 110 and/or the controller 120. In other words, the application producing apparatus 100 may receive the first application generation request and/or the second application generation request through the receiver 110, and since such an operation is performed by the communication unit 130 and/or the input unit 140, the communication unit 130 and the input unit 140 may be components forming the receiver 110. Here, the communication unit 130 and the input unit 140 may be separate electronic devices or may be classified as electronic devices in the same category of the receiver 110 due to functional similarity.

The display unit 150 may be a physical component and/or device that provides, to the user of the application producing apparatus 100, a process of producing an application and/or an example of driving an application to be produced, in visual and/or visual and audio data. The display unit 150 may be at least one of a screen, a monitor, a projector, a headset, a touch panel, etc. The display unit 150 of the application producing apparatus 100 may be built-in and/or may be external to the application producing apparatus 100.

The memory 160 may perform a function of temporarily or permanently storing data processed by the application producing apparatus 100. The memory 160 may be a volatile or non-volatile memory capable of storing information, data, computer readable instructions, etc., such as a random access memory (RAM), a read only memory (ROM), a disc drive, a solid state drive, a magnetic storage medium, a flash drive, an optical drive, etc., The memory 160 may also include, or may be in communicative connection with (via a bus not shown) a mass storage device (not shown) that acts as a non-transitory computer-readable storage medium. Also, program codes (e.g., computer readable instructions) for an operating system (OS) and other program codes associated with the receiver 110, controller 120, communication unit 130, program manager 170, etc., may be stored in the memory 160. Such software constituent elements may be loaded from another non-transitory computer-readable storage medium separate from the memory 160 using a drive mechanism (not shown). The other non-transitory computer-readable storage medium may include, for example, a floppy disk, a hard disk, a tape storage device, a Bluray/DVD/CD-ROM, a memory card, etc. Software constituent elements may be loaded to the memory 160 through the communication unit 130 instead of, or in addition to, the non-transitory computer-readable storage medium.

The program manager 170 may be a component that stores and/or manages software for performing various necessary or supportive operations for providing an application producing function. The program manager 170 may be a processing device separate from the controller 120, or may be combined with the controller 120.

Figure 5:
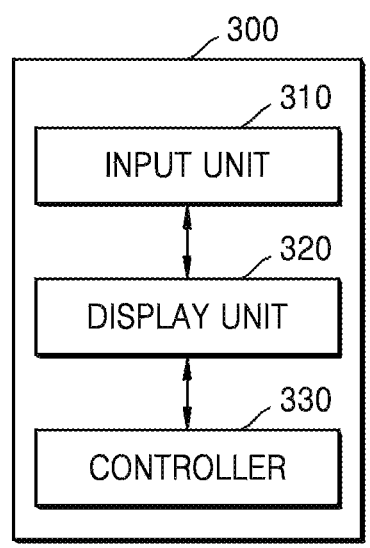
FIGS. 5 and 6 are block diagrams of a structure of an application driving apparatus according to one or more example embodiments.
Figure 6:
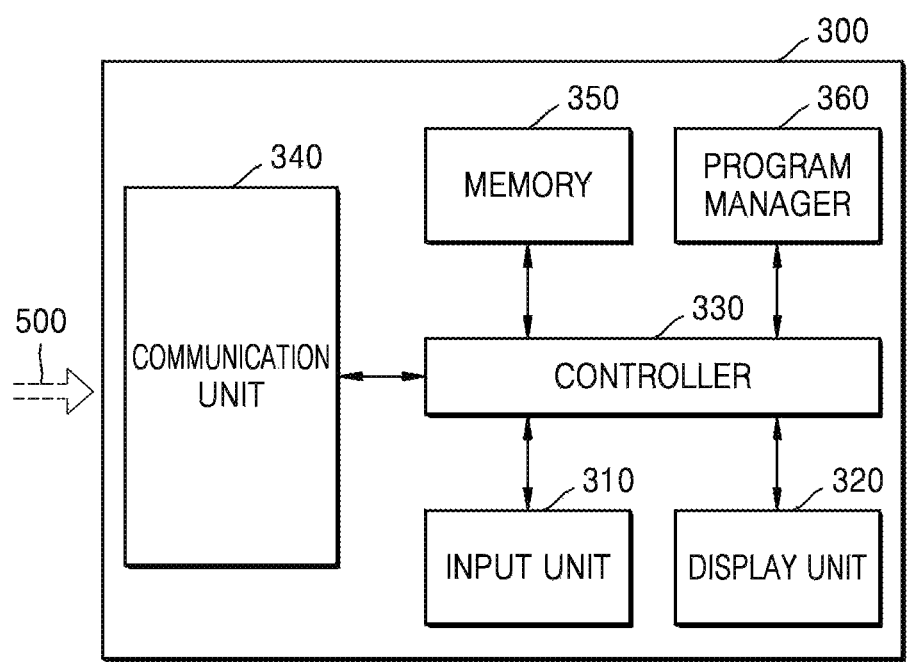

FIGS. 5 and 6 are block diagrams of a structure of the application driving apparatus 300 according to example embodiments.

Hereinafter, details overlapping those of FIGS. 1 through 4 are not provided again.

First, referring to FIG. 5, the application driving apparatus 300 according to at least one example embodiment may include an input unit 310, a display unit 320, a controller 330, etc., but is not limited thereto. For example, the application driving apparatus 300 may include a lesser or greater number of constituent elements.

The input unit 310 may be a physical device that receives user inputs, such as commands requesting to perform various types of operations from the user of the application driving apparatus 300. The input unit 310 may be at least one of a mouse, a keyboard, a touch pad, a microphone, a camera, a touch panel, various types of sensors, etc.

For example, the input unit 310 may receive a command to execute the first application from the user of the application driving apparatus 300. Also, the input unit 310 may receive a command to execute the second application, wherein the driving of the second application is determined (e.g., subordinately determined) based on the driving of the first application, according to a function provided by the first application.

The display unit 320 may be a physical component and/or device that displays the first application and/or the second application. The display unit 320 may display the first application on an image display window occupying at least a part of the display unit 320, and may display the second application on an image display window on a second part of the display unit 320 that may or may not overlap the image display window of the first application. Also, the display unit 320 may also display the switch interface on the first application and/or the second application.

The display unit 320, and the display unit 150, may include at least one of a liquid crystal display (LCD), a thin-film transistor-liquid crystal display (TFT-LCD), an organic light-emitting diode (OLED), a flexible display, a 3-dimensional (3D) display, an electrophoretic display, a virtual reality (VR) display, an augmented reality (AR) display, etc., but is not limited thereto. The display unit 320 may be at least one of a screen, a monitor, a projector, a headset, a touch panel, etc. The display unit 320 of the application driving apparatus 300 may be built-in and/or may be external to the application driving apparatus 300. Also, according to at least one example embodiment of the application driving apparatus 300, the application driving apparatus 300 may include two or more display units 320.

The controller 330 may control operations of one or more applications, such as the first application and/or the second application, etc. According to at least one example embodiment, the controller 330 may control the operations of the various applications, such as for example, the first application and/or the second application based on the state of the switch interface, however the example embodiments are not limited thereto. For example, the controller 330 may control the operation of the first application based on an input received related to the first application, such as an input received on and/or through a first (or desired) location in the application driving apparatus 300 when the switch interface is in the first state. The first location may be a location on the display unit of the application driving apparatus 300. The controller 330 may control the operation of the second application based on the input received through the first location when the switch interface is in the second state. Meanwhile, the controller 330 may be at least one data processing device, for example, a data processing device that is embedded in hardware and includes a physically structured circuit to perform a function expressed in a code or command included in a program. Examples of such a data processing apparatus include a microprocessor, a central processing unit (CPU), one or more processor cores, a multiprocessor, an application specific integrated circuit (ASIC), a field programmable gate array (FPGA), a System on Chip (SoC), etc., but are not limited thereto. The controller 330 may be configured to access and/or execute programs, functions, instructions, and data stored in a memory (not shown). Once the program (e.g., computer readable instructions) is loaded into the controller 330, the controller 330 executes the program (e.g., computer readable instructions), thereby transforming the controller 330 into a special purpose processor. The controller 330 may be implemented as one or more processors, one or more processor cores, a distributed processing system, a network processing system, a cloud processing system, etc. The controller 330 may include components and/or be specially caused to execute as an input unit 310, communication unit and/or program manager, etc., and may also control the input unit 310 and/or the display unit 320, etc.

According to at least one example embodiment, the controller 330 may control the state of the switch interface to be any one of a plurality of states, such as the first and second states, etc., based on an input received through a second location in the application driving apparatus 300.

Also, the controller 330 may maintain the active state of the first application even when the state of the switch interface changes, for example from the first state to the second state.

Also, the controller 330 may adjust the display settings of the applications, such as the display size, the display proportions, the window state, whether the application is in the foreground or the background of the display, the display device that the application is displayed upon in a multi-display environment, etc., based on the state of the switch interface. For example, the controller 330 may determine the state of the switch interface to be the first state when the display size or the display proportions of the second application are lower than or equal to the first reference value, and determine the state of the switch interface to be the second state when the display size or the display proportions of the second application are higher than the first reference value, etc., but is not limited thereto.

Also, the controller 330 may adjust the transparency setting and/or other visual settings (e.g., color settings, two-dimension (2D) or three-dimension (3D) settings, video format settings, video resolution settings, video playback settings (e.g., frames per second playback settings, etc.), video compression settings, etc.) of the applications, such as the second application, based on the state of the switch interface. For example, the controller 330 may determine the state of the switch interface to be the first state when the transparency of the second application is higher than the second reference value, and determine the state of the switch interface to be the second state when the transparency of the second application is lower than or equal to the second reference value, but the example embodiments are not limited thereto.

Meanwhile, referring to FIG. 6, the application driving apparatus 300 according to at least one example embodiment may further include a communication unit 340, a memory 350, a program manager 360, etc., but the application driving apparatus 300 is not limited thereto and may include a lesser or greater number of constituent elements.

The communication unit 340 may be a physical device configured to transmit and receive a data signal to and from at least one of the application producing apparatus 100 over a wired and/or wireless connection, the application distribution server 400, the first application management server 601, the second application management server 602, etc. The communication unit 340 may be a Bluetooth communication unit, a BLE communication unit, an NFC unit, a WLAN (Wi-Fi) communication unit, a GSM communication unit, a CDMA communication unit, an LTE communication unit, a Zigbee communication unit, an IrDA communication unit, a WFD communication unit, an UWB communication unit, and/or an Ant+ communication unit, but is not limited thereto.

According to at least one example embodiment, the controller 300 may control the application driving apparatus 300 and the communication unit 340 such that requests according to an input related to at least one of the applications received through the application driving apparatus 300 are transmitted to the first application management server 601 when the operation of the first application is controlled, and to the second application management server 602 when the operation of the second application is controlled.

The memory 350 may perform a function of temporarily or permanently storing data processed by the application driving apparatus 300. The memory 350 may be a volatile or non-volatile memory capable of storing information, data, computer readable instructions, etc., such as a random access memory (RAM), a read only memory (ROM), a disc drive, a solid state drive, a magnetic storage medium, a flash drive, an optical drive, etc., The memory 350 may also include, or may be in communicative connection with (via a bus not shown) a mass storage device (not shown) that acts as a non-transitory computer-readable storage medium. Also, program codes (e.g., computer readable instructions) for an operating system (OS) and other program codes associated with the input unit 310, display unit 320, controller 330, communication unit 3400, program manager 3600, etc., may be stored in the memory 350. Such software constituent elements may be loaded from another non-transitory computer-readable storage medium separate from the memory 350 using a drive mechanism (not shown). The other non-transitory computer-readable storage medium may include, for example, a floppy disk, a hard disk, a tape storage device, a Bluray/DVD/CD-ROM, a memory card, etc. Software constituent elements may be loaded to the memory 350 through the communication unit 340 instead of, or in addition to, the non-transitory computer-readable storage medium.

The program manager 360 may be a component that stores and/or manages software for performing various operations, including necessary and/or supportive operations, for providing an application driving function.

Figure 7:
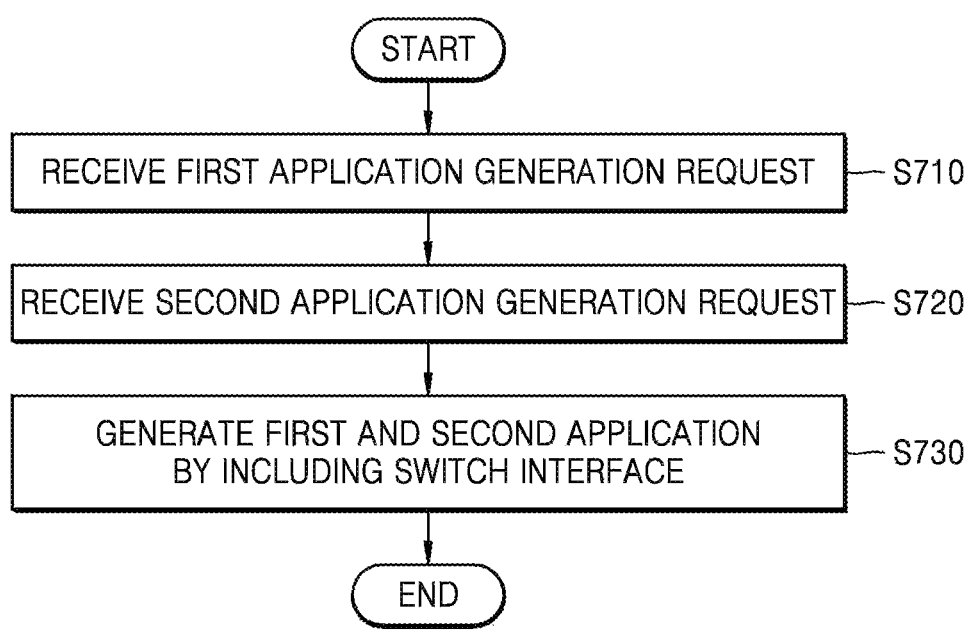
FIG. 7 is a flowchart of an application producing method according to at least one example embodiment.

FIG. 7 is a flowchart of an application producing method according to at least one example embodiment. Hereinafter, details overlapping those of FIGS. 1 through 6 are not provided again here.

Referring to FIG. 7, the application producing apparatus 100 according to at least one example embodiment may receive the first application generation request, in operation S710. Meanwhile, the application producing apparatus 100 according to another example embodiment may not receive the first application request, but may receive the first application that is fully generated or partially generated from an external apparatus and/or read from a memory. In other words, the application producing apparatus 100 may either receive a request to generate, compile, etc., the first application from an external apparatus, or it may receive a fully or partially generated, compiled, etc., form of the first application from an external apparatus and/or read the fully or partially generated, compiled, etc., application from memory.

At operation S720, the application producing apparatus 100 may receive the second application generation request.

Then, the application producing apparatus 100 may generate the first and second applications by including the switch interface, in operation S730. Here, the application producing apparatus 100 may generate the first and second applications by including a function for displaying the switch interface GUI element and/or other GUI elements on any one of the first and second applications. Meanwhile, the application producing apparatus 100 according to another example embodiment may generate only the second application in operation S730. In other words, in at least one example embodiment, only a single application, such as the second application, will be generated by including the function of displaying the switch interface on any one of the first and second applications, while the first application is already produced entirely or partially. Additionally, the example embodiments are not limited thereto, and for example, may include a greater number of application may be generated, a greater number and/or different GUI elements may be generated, a greater number of application generation requests may be received, etc.

Also, in FIG. 7, the first and second applications are generated after the first application generation request is received and the second application generation request is received. However, the example embodiments are not limited thereto and the application producing apparatus 100 according to another example embodiment may generate the first application after the first application generation request is received, and then generate the second application after the second application generation request is received, etc.

Figure 8:
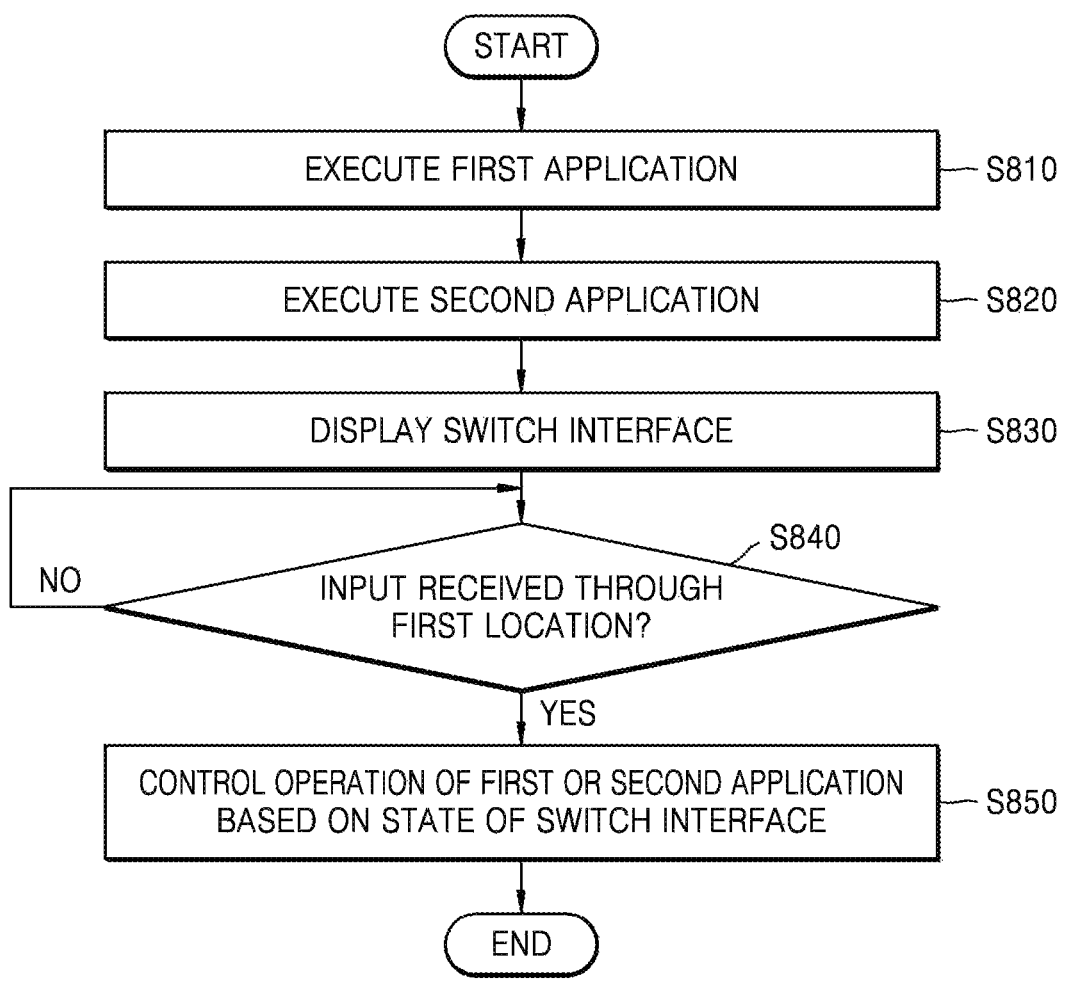
FIGS. 8 and 9 are flowcharts of an application driving method according to one or more example embodiments.
Figure 9:
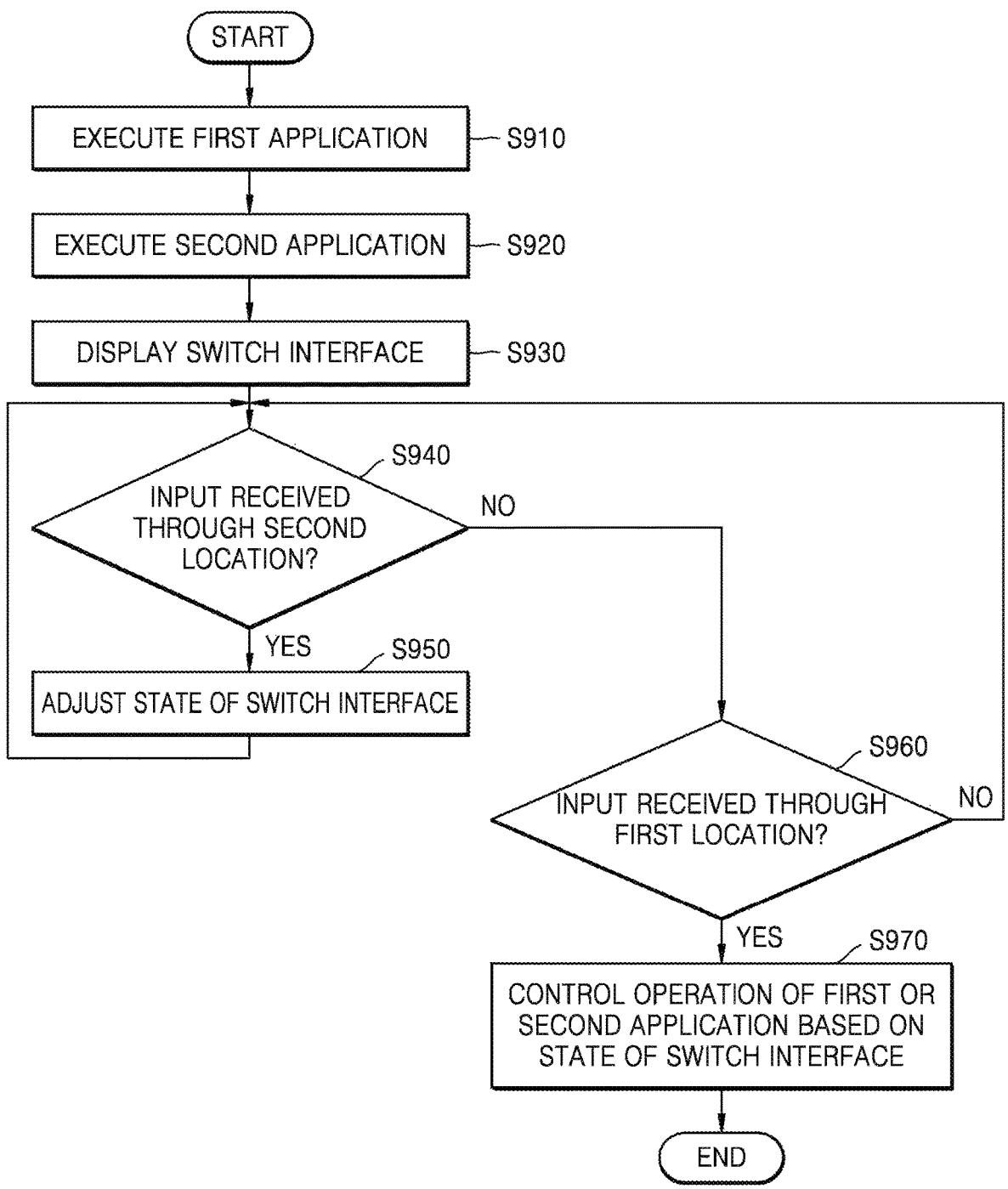

FIGS. 8 and 9 are flowcharts of an application driving method according to some example embodiments. Hereinafter, details overlapping those of FIGS. 1 through 6 are not provided again here.

First, referring to FIG. 8, the application driving apparatus 300 according to at least one example embodiment may execute (e.g., drive, run, load, activate, etc.) the first application in operation S810, and execute (e.g., drive, run, load, activate, etc.) the second application in operation S820. Here, the application driving apparatus 300 may perform operation S810 first, and then perform operation S820 when a function of receiving a command to execute the second application is selected on the first application, but the example embodiments are not limited thereto and the applications may be executed in any order. The application driving apparatus 300 may display the switch interface on the first application and/or the second application in operation S830.

The application driving apparatus 300 may determine whether an input is received related to at least one of the applications through a first (or desired) location, in operation S840. According to at least one example embodiment, the first location may be at least a part of a region where the first application is displayed, but is not limited thereto, and may include any input location that provides commands related to any of the applications, such as a physical input (e.g., a physical input button, a voice command, a gesture command, a motion command, etc.), a software input (e.g., a virtual input button, a software command issued from another application, etc.), an input received through a network connection, etc. When it is determined that the input is not received through the first location, the application driving apparatus 300 may standby until the input is received through the first location. In at least one example embodiment, the first location may be related to the display location of the switch interface, but is not limited thereto.

When it is determined that the input is received through the first location, the application driving apparatus 300 may control an operation of any one of the first and second applications based on the state of the switch interface, in operation S850. For example, when the switch interface is in the first state, the application driving apparatus 300 may interpret that the input through the first location is for controlling the first application, and thus control the operation of the first application in response to the input through the first location. Similarly, when the switch interface is in the second state, the application driving apparatus 300 may interpret that the input through the first location is for controlling the second application, and thus control the operation of the second application in response to the input through the first location. However, the example embodiments are not limited thereto and there may be more than two states associated with the switch interface, and there may be a greater or lesser number of applications as well.

Meanwhile, referring to FIG. 9, the application driving apparatus 300 according to another example embodiment may further adjust the state of the switch interface based on an input through a second desired location.

First, the application driving apparatus 300 may execute (e.g., drive, run, load, activate, etc.) the first application in operation S910, execute (e.g., drive, run, load, activate, etc.) the second application in operation S920, and display the switch interface in operation S930. However, the example embodiments are not limited thereto and the applications may be executed in any order, the example embodiments are not limited to two applications, and there may be a plurality of GUI elements, such as additional switch interfaces.

Then, the application driving apparatus 300 may determine whether the input is received through the second location in operation S940. Here, the second location may be a part of a region where the first or second application is displayed, but is not limited thereto, and may include any input location that provides commands related to any of the applications, such as a physical input (e.g., a physical input button, a voice command, a gesture command, a motion command, etc.), a software input (e.g., a virtual input button, a software command issued from another application, etc.), an input received through a network connection, etc. Also, the second location may be a location that does not overlap the first location and/or is partially included in the first location.

When it is determined that the input is received through the second location, the application driving apparatus 300 may adjust the state of the switch interface correspondingly to the input through the second location, in operation S950. Here, the application driving apparatus 300 may change the state of the switch interface from the first or second state to another state (e.g., by toggling the states, etc.) or adjust the state of the switch interface while maintaining an original state, correspondingly to the input through the second location.

When it is determined that the input is not received through the second location, the application driving apparatus 300 may determine whether the input is received through the first location, in operation S960. When it is determined that the input is not received through the first location, the application driving apparatus 300 may perform operation S940. When it is determined that the input is received through the first location, the application driving apparatus 300 may control an operation of any one of the applications, such as the first and second applications, based on the state of the switch interface, in operation S970.

FIGS. 10 through 15 are diagrams for describing examples of a form of providing an application driving service, according to some example embodiments.

Figure 10:
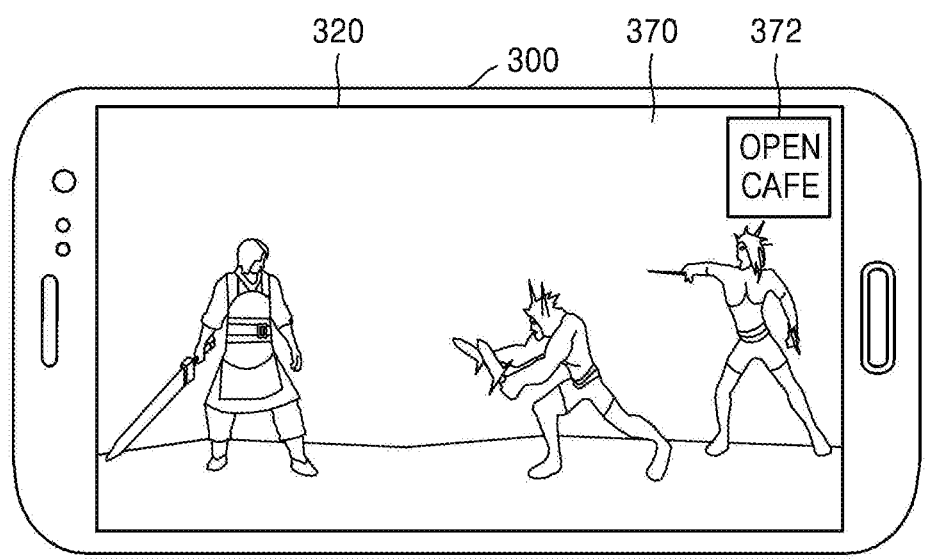
FIGS. 10 through 15 are diagrams for describing examples of providing an application driving service, according to one or more example embodiments.

First, referring to FIG. 10, the first application may be executed and displayed on the display unit 320 of the application driving apparatus 300. In other words, a first application image 370 associated with the first application may be displayed on the display unit 320. For example, when the first application is a game, the first application image 370 may illustrate a scene from the game, such as an image of a game character holding a sword to fight opponents, and the first application image 370 may be displayed on the display unit 320 of the application driving apparatus 300.

Additionally, according to at least one example embodiment, an interface for opening a second application, such as the cafe opening interface 372, may be displayed on the application driving apparatus 300, as a GUI for executing the second application. The second application may be an application that may or may not be directly related to the first application, such as a cafe application that provides an Internet community for sharing information related to the first application, a social media network application, a media sharing application, an email application, a chat application, a phone application, a file sharing application, a document application, etc. Additionally, there may be a plurality of applications generated and a plurality of corresponding application opening GUI interfaces generated and displayed on the first application image 370 according to other example embodiments.

Figure 11:
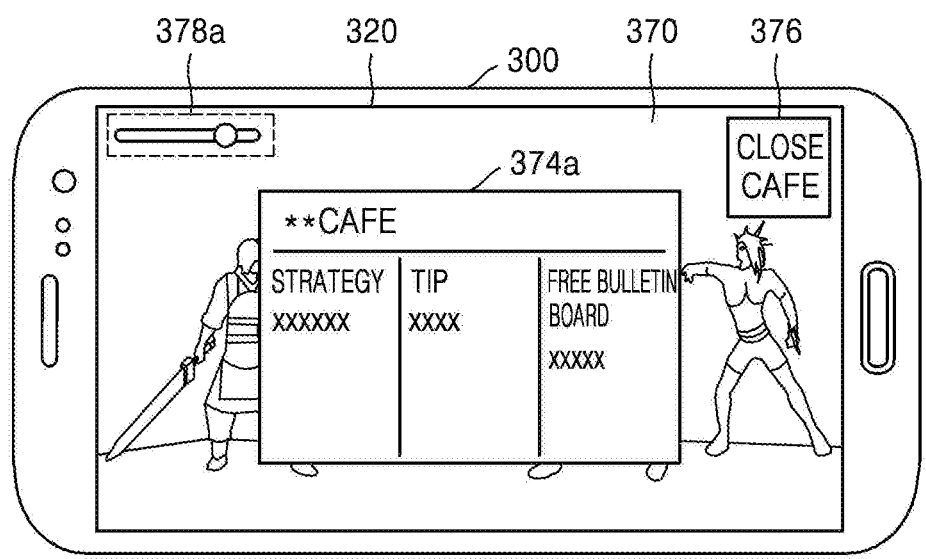

When the user of the application driving apparatus 300 selects the second application opening interface 372 (e.g., café opening interface, etc.), the application driving apparatus 300 may execute the second application as shown in FIG. 11. Here, a second application image 374a associated with the second application may be displayed in a form of occupying at least a part of the first application image 370, according to at least one example embodiment but is not limited thereto. For example, the user of the application driving apparatus 300 may select the cafe opening interface 372 while enjoying the first application, and at this time, the application driving apparatus 300 may execute the second application to display the second application image 374a.

The application driving apparatus 300 may display a switch interface 378a on the first application image 370 or the second application image 374a. For example, as shown in FIG. 11, the application driving apparatus 300 may display, on a partial region of the first application image 370, the switch interface 378a in a form in which a movable circular cursor exists on a bar shaped interface (e.g., slider GUI element), but the example embodiments are not limited thereto and the switch interface may take any other form.

According to at least one example embodiment, a location of the movable circular cursor on the switch interface 378a may modify and/or indicate a setting that corresponds to the switch interface 378a, such as a transparency, a size, a display method, etc., of the second application on the application driving apparatus 300. In other words, the switch interface may relate and/or correspond to one or more settings related to the application and/or the application driving apparatus 300, and by receiving input from a user regarding the switch interface, the related and/or corresponding setting(s) may be controlled by the user. Additionally, the switch interface 378a may control the value of the setting associated with the switch interface, for example, if the setting may be set to a value within the range of 0-100, the user's input regarding the switch interface 378a may control the value set for the related setting.

For example, as shown in FIG. 11, when the movable circular cursor is at the right on the switch interface 378a (when the switch interface 378a is related to a transparency setting of the second application), the transparency of the second application image 374a may be very low. In this case, as shown in FIG. 11, a region of the first application image 370, which is covered by the second application image 374a, may not be seen or may be barely seen.

Figure 12:
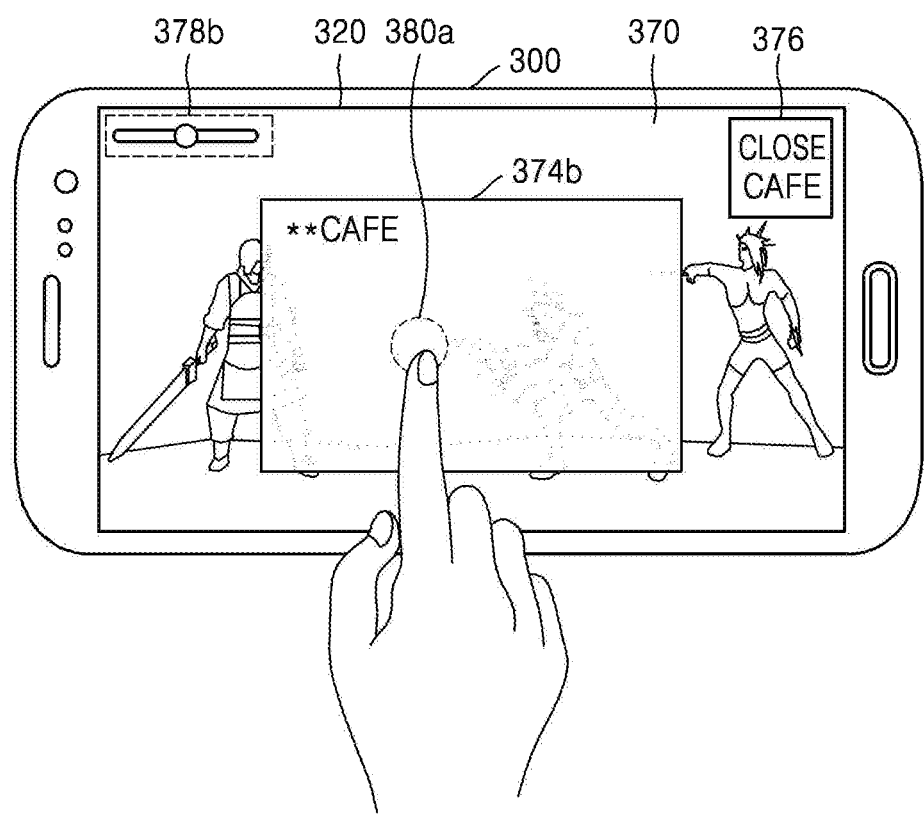

When the movable circular cursor is located in the middle on a switch interface 378b as shown in FIG. 12, a second application image 374b may have medium transparency. In this case, as shown in FIG. 12, the region of the first application image 370 covered by the second application image 374b may be vaguely but recognizably seen. At this time, the second application image 374 may also be vaguely but recognizably seen.

Figure 13:
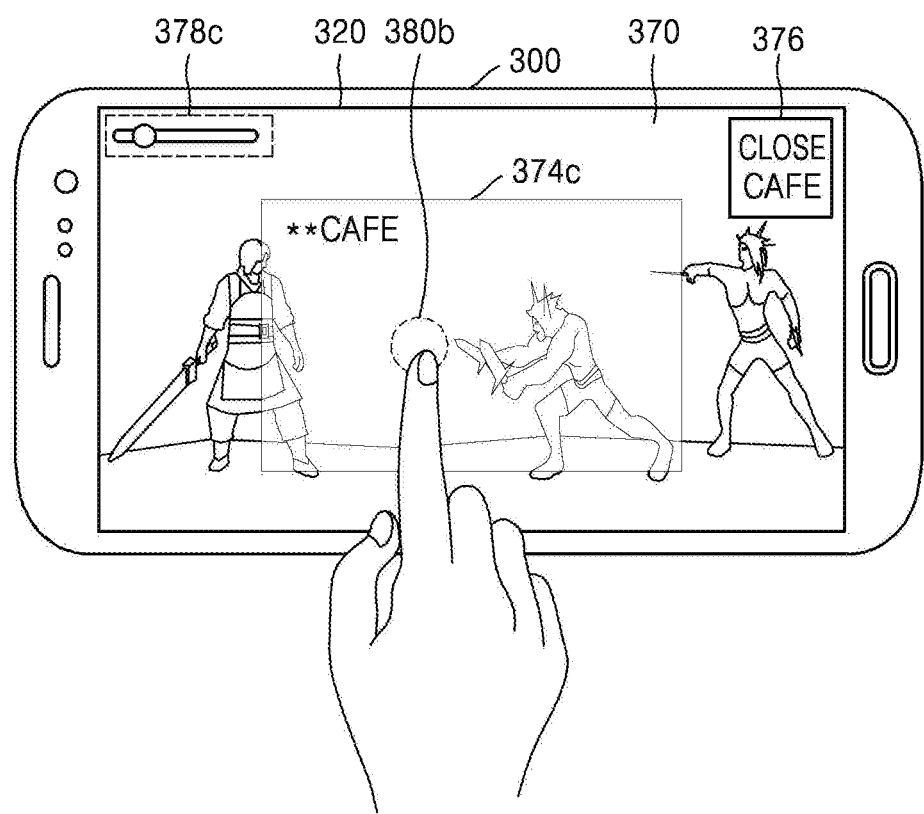

When the movable circular cursor is at the left on a switch interface 378c as shown in FIG. 13, a second application image 374c may have very high transparency. At this time, as shown in FIG. 13, the region of the first application image 370, which is covered by the second application image 374c, may be almost clearly recognizably displayed. In this case, the second application image 374c may be very vaguely displayed such that it is barely recognizable.

In other words, the application driving apparatus 300 may display the first application image 370 and the second application image 374a, 374b, or 374c simultaneously on the display unit 320 while adjusting the transparency of the second application image 374a, 374b, or 374c based on the state of the switch interface 378a, 378b, or 378c, thereby enabling the user of the application driving apparatus 300 to check the first application and/or the second application.

At this time, the application driving apparatus 300 may determine a desired and/or certain standard to determine the state of the switch interface.

For example, the application driving apparatus 300 may determine that the switch interface 378b of FIG. 12 is in the second state and the switch interface 378c of FIG. 13 is in the first state. The application driving apparatus 300 may determine the state of the switch interface 378b or 378c to be one of the first and second states based on the location of the movable circular cursor on the switch interface 378b or 378c. In other words, there may be one or more desired threshold values set related to the switch interface and/or the setting associated with the switch interface and the state of the switch interface may be controlled based on the desired threshold values. For example, a first threshold value may be set to 75 and if the switch interface value is equal to or greater than 75, the switch interface may be determined to be in the first state. A second threshold value may be set to 25 and if the switch interface value is equal to or less than 25, the switch interface may be determined to be in the second state. If the switch interface value is set to a value between 25 and 75, the switch interface may be determined to be in a third state, etc.

When the second application image 374*b* is relatively slightly transparent as shown in FIG. 12, i.e., when the second application image 374*b* is still recognizably displayed (e.g., the switch interface is above a desired threshold value and is determined to be in a second state that indicates that the second application is to be active), the operation of the second application may be controlled according to a tap operation of the user with respect to a first location 380*a*. For example, when the tap operation of the user with respect to the first location 380*a* is an operation of selecting a location where a word "tip" (see FIG. 11) is written in the second application image 374*b*, the application driving apparatus 300 may perform an operation of providing information corresponding to a tip by driving the second application, but the example embodiments are not limited thereto. In this case, the application driving apparatus 300 may control the operation of the second application by communicating with the second application management server 602 over a wired and/or wireless connection.

When the second application image 374*c* is relatively very transparent as shown in FIG. 13, i.e., when the second application image 374*c* is so transparently displayed as to be barely recognizable (e.g., the switch interface is below a desired threshold value and is determined to be in a first state that indicates that the first application is to be active), an operation of the first application may be controlled in response to a tap operation of the user with respect to a first location 380*b*. For example, when the tap operation of the user with respect to the first location 380*b* is an operation of selecting a location where a game character holding two daggers exists in the second application image 374*c*, the application driving apparatus 300 may perform an operation of attacking the game character holding two daggers by driving the first application, but the example embodiments are not limited thereto. At this time, the application driving apparatus 300 may control the operation of the first application by communicating with the first application management server 601 over a wired and/or wireless connection.

In other words, even when the input of the user is received with respect to the first locations 380*a* and 380*b*, which correlate to the same location on the display (or may correlate to the same physical button, voice command, gesture command, motion command, etc.), the application driving apparatus 300 may control the operation of one of a plurality of applications (e.g., the first and second applications) based on the state of the at least one switch interface (e.g., switch interfaces 378*a* through 378*c*).

Meanwhile, the application driving apparatus 300 may maintain the first application to be in the active state even when the second application is operating. For example, as shown in FIG. 12, when the switch interface 378*b* is in the second state, the application driving apparatus 300 may maintain the active state of the first application such that, if the first application is a game, a battle in the first application is continuously performed according to a command determined when the switch interface 378*b* was in the first state, while driving the second application in response to the input with respect to the first location 380*a*. Accordingly, the application driving apparatus 300 may maintain the active state of the first application while enabling the user of the application driving apparatus 300 to have an opportunity of obtaining information through the second application.

Figure 14:
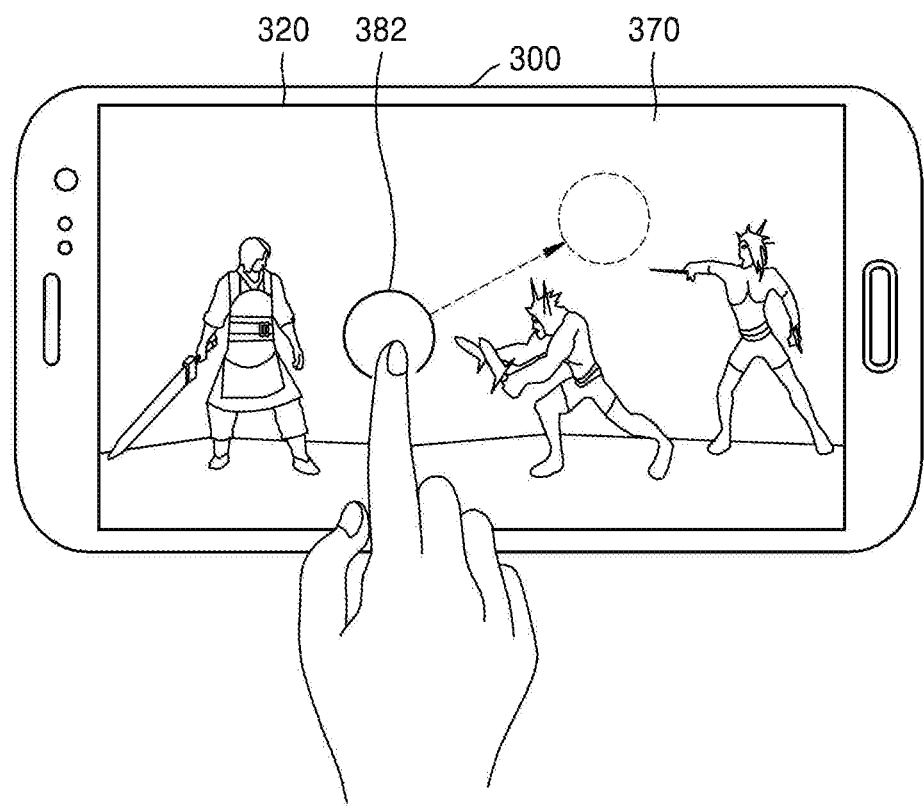

Meanwhile, referring to FIG. 14, another GUI element that is movable, such as a floating button interface 382, may be displayed on the application driving apparatus 300, as a GUI element indicating and/or corresponding to the second application.

According to at least one example embodiment, a location of the floating button interface 382 may change and/or be moved according to manipulation of the GUI element by the user of the application driving apparatus 300. For example, as shown in FIG. 14, when the user of the application driving apparatus 300 touches and drags the floating button interface 382 on the display unit 320, the floating button interface 382 may move to a location where the user touches the application driving apparatus 300. Here, the touching and dragging is only an example and the location of the floating button interface 382 may be changed on the display unit 320 via any type of input receivable by the application driving apparatus 300.

Figure 15:
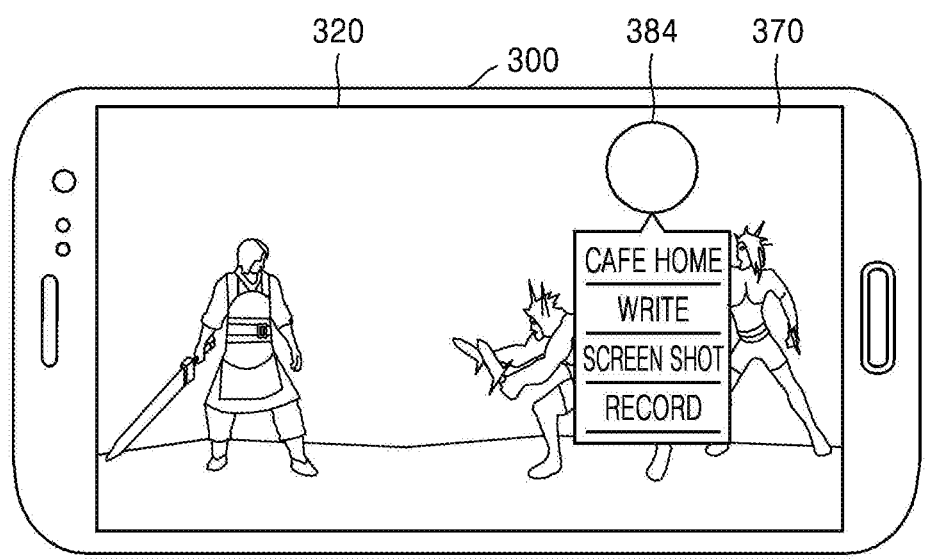

Meanwhile, referring to FIG. 15, when the user of the application driving apparatus 300 selects a floating button interface 384, a window for interacting with the second application (e.g., displaying commands related to the second application, opening and/or closing the display of the second application, starting the second application, etc.) may be displayed on a region connected to the floating button interface 384 or on a desired and/or certain location on the display unit 320. For example, as shown in FIG. 15, the user of the application driving apparatus 300 may perform an input, such as single tapping or double tapping, on a location where the floating button interface 384 is displayed, and at this time, operations related to the second application, such as opening a cafe application's home page, opening a document application and enabling the user to write a note, opening a photo application and allowing the user to take a screen shot, opening a media creation application and allowing the user to record a video, etc., may be displayed on the display unit 320.

As such, the application driving apparatus 300 may maintain the active state of the first application while operating the second application. For example, as shown in FIG. 15, the floating button interface 384 may maintain the active state of the first application such that the execution of the first application is continuously performed according to the determined command (e.g., the battle depicted in FIG. 15, or any other operation associated with the application) even when a window indicating the operations related to the second application is displayed, or vice versa. Accordingly, the application driving apparatus 300 may maintain the active state of at least one of the plurality of applications while enabling the user of the application driving apparatus 300 to have an opportunity of obtaining information through a second application of the plurality of applications.

According to at least one application producing apparatus, application producing method, application producing system, and/or a non-transitory computer readable medium of various example embodiments, an application producer may produce a second application by subordinating the second application to a first application, and at this time, a switch interface for switching, selecting, and/or controlling the first and second applications may also be provided.

Also, according to at least one application producing apparatus, application producing method, application producing system, and/or a non-transitory computer readable medium of various example embodiments, an application user may execute a second application subordinated to a first application, and at this time, a switch application for switching, selecting, and/or controlling the first and second applications may be provided to the application user.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An application producing method regarding a first application and a second application, the method comprising:
   receiving, using at least one processor, an application generation request related to the second application, the second application being subordinate to the first application;
   generating, using the at least one processor, the second application and computer readable instructions related to a switch interface for selecting at least one of the first and second applications,
      the switch interface computer readable instructions related to the switch interface, which when executed by at least one application executing apparatus, causes the at least one application executing apparatus to,
         display the switch interface on at least one of the first and second applications, and
         when the switch interface is in a first state, the first application receives and is controlled by a first user input received by the at least one application executing apparatus irrespective of a location of the first user input,
         when the switch interface is in a second state, the second application receives and is controlled by the first user input irrespective of the location of the first user input, and
         an active state of the first application or the second application is maintained when the state of the switch interface changes between the first state and the second state, the maintaining of the active state includes maintaining a transparency level and display settings of the previously active application; and
   sending the generated second application and the switch interface computer readable instructions to the at least one application executing apparatus.

2. The application producing method of claim 1, wherein the switch interface computer readable instructions further causes the at least one application executing apparatus to:
   control the state of the switch interface based on a second user input received by the at least one application executing apparatus.

3. The application producing method of claim 1, wherein the switch interface computer readable instructions further causes the at least one application executing apparatus to:
   when the state is in the first state, transmit commands related to the first user input to a first server associated with the first application; and
   when the state is in the second state, transmit commands related to the first user input to a second server associated with the second application.

4. The application producing method of claim 1, wherein the switch interface computer readable instructions further causes the at least one application executing apparatus to:
   maintain the active state of the first application after the state of the switch interface is changed from the first state to the second state.

5. The application producing method of claim 1, wherein the switch interface computer readable instructions further causes the at least one application executing apparatus to:
   adjust the transparency setting of the second application according to the state of the switch interface.

6. The application producing method of claim 5, wherein the adjusting the transparency setting includes:
   determining the state of the switch interface to be in the first state when the transparency setting of the second application is higher than a transparency reference value; and
   determining the state of the switch interface to be in the second state when the transparency setting of the second application is lower than or equal to the transparency reference value.

7. The application producing method of claim 1, wherein the switch interface computer readable instructions further causes the at least one application executing apparatus to:
   adjust a display size setting or a display proportion setting of the second application based on the state of the switch interface.

8. The application producing method of claim 7, wherein the adjusting the display size setting or the display proportion setting of the second application includes:
   determining the state of the switch interface to be in the first state when the display size setting or the display proportion setting of the second application are higher than a display reference value; and
   determining the state of the switch interface to be in the second state when the display size setting or the display proportion setting of the second application are lower than or equal to the display reference value.

9. A non-transitory computer-readable recording medium having application producing computer readable instructions stored thereon, which when executed by a computer, performs the method of claim 1.

10. An application producing apparatus regarding a first application and a second application, the apparatus comprising:
   a memory having computer readable instructions stored thereon; and
   at least one processor configured to execute the computer readable instructions to,
   receive an application generation request related to the second application, the second application being subordinate to the first application;
   generate the second application and switch interface computer readable instructions related to a switch interface for selecting at least one of the first and second applications,
      the switch interface computer readable instructions, when executed by at least one application executing apparatus, causes the at least one application executing apparatus to,
         display the switch interface on at least one of the first and second applications, and
         when the switch interface is in a first state, the first application receives and is controlled by a first user input received by the at least one application executing apparatus irrespective of a location of the first user input, when the switch interface is in a second state, the second application receives and is controlled by the first user input irrespective of the location of the first user input, and an active state of the first application or the second application is maintained when the state of the switch interface changes between the first state and the second state, the maintaining of the active state includes maintaining a transparency level and display settings of the previously active application; and sending the generated second application and the switch interface computer readable instructions to the at least one application executing apparatus.

11. The application producing apparatus of claim 10, wherein the switch interface computer readable instructions further causes the at least one application executing apparatus to:

control the state of the switch interface based on a second user input received by the application executing apparatus.

12. The application producing apparatus of claim 10, wherein the switch interface computer readable instructions further causes the at least one application executing apparatus to:

when the state is in the first state, transmit commands related to the first user input to a first server associated with the first application; and when the state is in the second state, transmit commands related to the first user input to a second server associated with the second application.

13. The application producing apparatus of claim 10, wherein the switch interface computer readable instructions further causes the at least one application executing apparatus to:

maintain the active state of the first application after the state of the switch interface is changed from the first state to the second state.

14. An application driving apparatus comprising:

a memory having computer readable instructions stored thereon; and at least one processor configured to execute the computer readable instructions to, execute a first application and a second application, the second application being subordinate to the first application;

display a switch interface on at least one of the first and second applications; and receive a first user input; and when the switch interface is in a first state, control the first application using the first user input irrespective of a location of the first user input, when the switch interface is in a second state, control the second application using the first user input irrespective of the location of the first user input, and an active state of the first application or the second application is maintained when the state of the switch interface changes between the first state and the second state, the maintaining of the active state includes maintaining a transparency level and display settings of the previously active application.

15. The application driving apparatus of claim 14, wherein the at least one processor is configured to:

control a state of the switch interface to be the first state or the second state based on a second user input.

16. The application driving apparatus of claim 14, wherein the at least one processor is configured to:

transmit commands related to the first user input to a first server associated with the first application when the switch interface is in the first state; and transmit commands related to the first user input to a second server associated with the second application when the switch interface is in the second state.

17. The application driving apparatus of claim 14, wherein the first application remains active when the state of the switch interface changes from the first state to the second state.

18. The application driving apparatus of claim 14, wherein the at least one processor is configured to:

adjust the transparency setting of the second application based on the state of the switch interface, wherein when the state of the switch interface is in the first state, the transparency setting of the second application is higher than a reference value, and when the state of the switch interface is in the second state, the transparency setting of the second application is lower than or equal to the reference value.

19. The application driving apparatus of claim 14, wherein the at least one processor is configured to:

adjust a display size setting or display proportion setting of the second application based on the state of the switch interface, wherein when the switch interface is in the first state, the display size setting or the display proportion setting of the second application are lower than or equal to a reference value, and when the switch interface is in the second state, the display size setting or the display proportion setting of the second application are higher than the reference value.

* * * * *